July 12, 1955   DE ROY SIMPSON   2,712,918
DISCHARGE GATE SYPHON
Filed Sept. 4, 1951   2 Sheets-Sheet 1
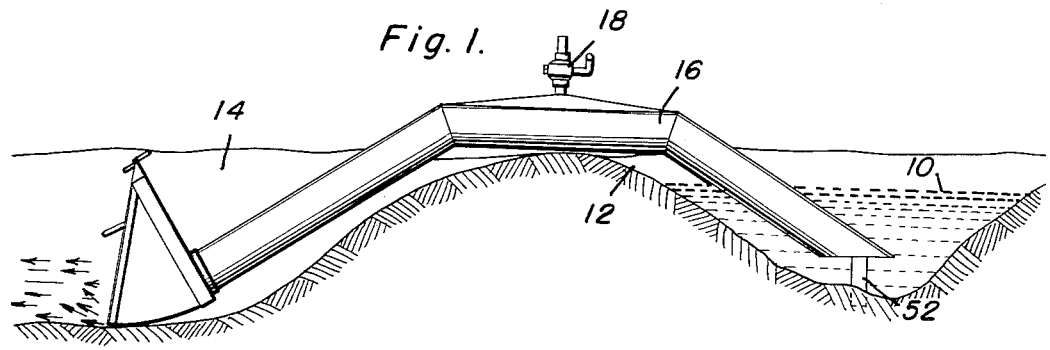
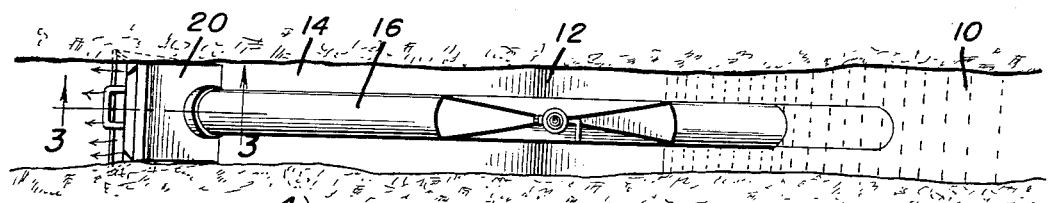
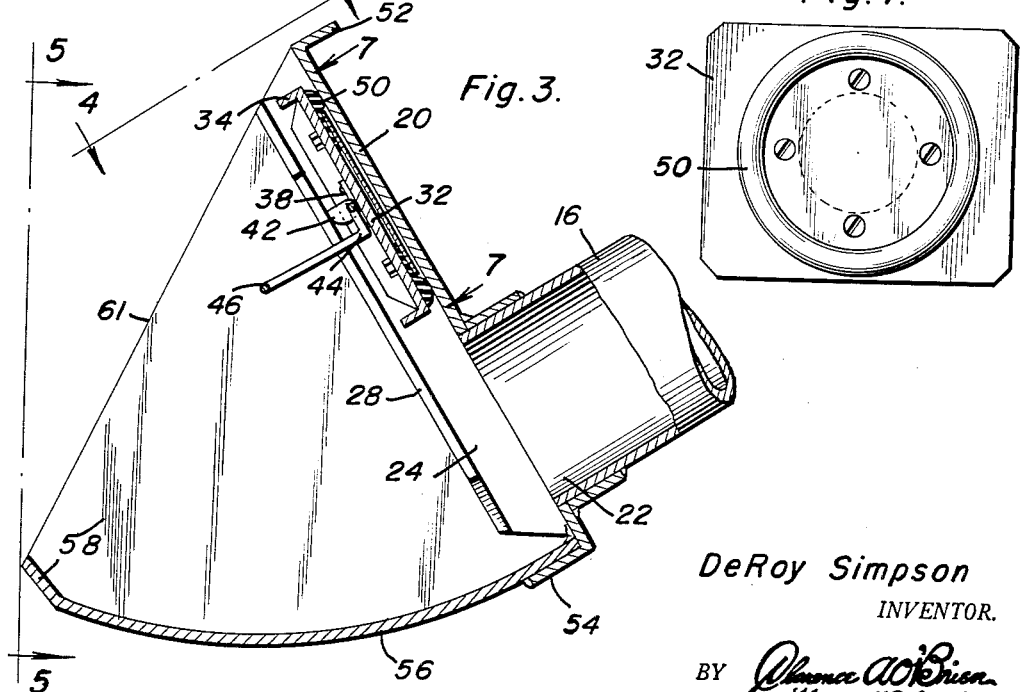
DeRoy Simpson
INVENTOR.

July 12, 1955  DE ROY SIMPSON  2,712,918
DISCHARGE GATE SYPHON
Filed Sept. 4, 1951  2 Sheets-Sheet 2
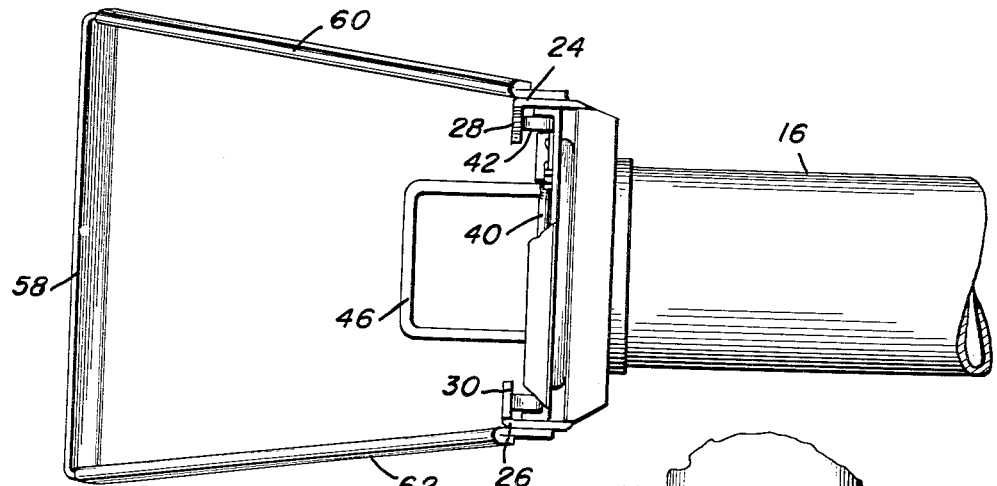
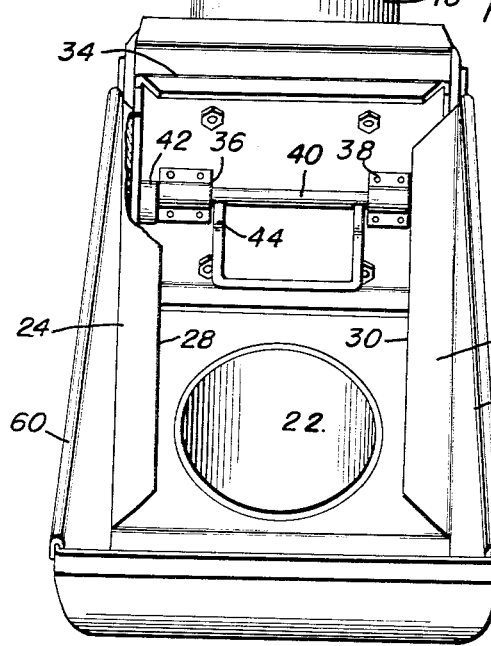
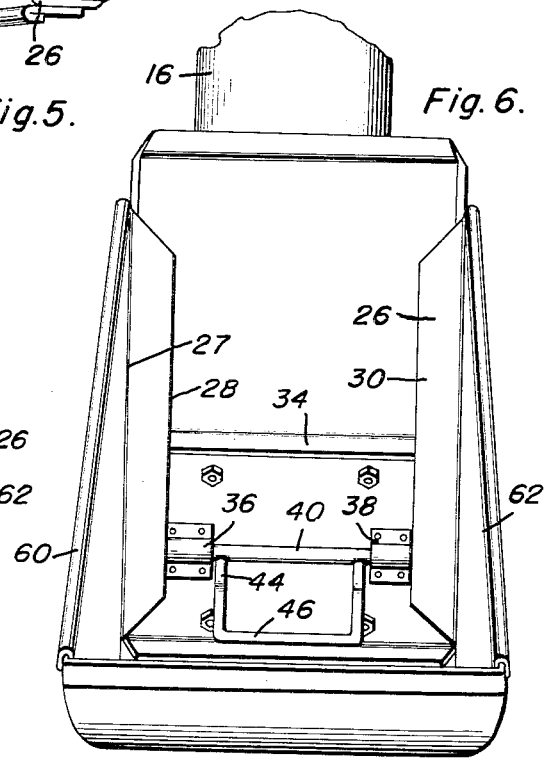
De Roy Simpson
INVENTOR.

United States Patent Office 2,712,918
Patented July 12, 1955

2,712,918
DISCHARGE GATE SYPHON
De Roy Simpson, Tulelake, Calif.

Application September 4, 1951, Serial No. 245,049

3 Claims. (Cl. 251—147)

This invention relates to a discharge gate syphon and particularly to a discharge gate for controlling the flow of water in an irrigation ditch.

In the operation of irrigation systems, it is frequently desirable to control the water in the various irrigation ditches and different places therealong. This is usually accomplished by building dam, generally of an earthen construction, across the irrigation ditch, however, it is seldom desirable to completely shut off the flow of water through the ditch. The proper control of water flow past the control dam has heretofore been a troublesome problem in all irrigation work. If small bleeder ditches are constructed through the dam, the flow of water eats away the earthen structure so that the flow of water is not easily controlled. The operation of permanent gates and the various installations where a control may be desired, is too expensive to contemplate.

It has heretofore been proposed to utilize syphons over the dam to control the flow of water over the dam. However, the control of the flow of water over the dam has been a major problem.

This invention provides a control gate which can be utilized with irrigation syphons or with other types of irrigation control dams to positively control the flow of water past the stoppage in the irrigation ditch.

The apparatus according to this invention provides a gate plate which may be connected to the outside end of a syphon or to any dam structure in an irrigation ditch, and has a gate pan that can be firmly adjusted in any position to control the amount of water going through the openings in the gate plate.

It is accordingly an object of this invention to provide a control gate for an irrigation system.

It is another object of this invention to provide a control gate having an airtight seal.

It is still another object of this invention to provide a syphon that can be primed by a hand pump.

It is a further object of this invention to provide a syphon that holds its prime when stopped.

It is still another object of this invention to provide a self cleaning control gate for an irrigation system.

It is a further object of this invention to provide a control gate in which the flow of water through the gate can be adjusted.

It is a further object of this invention to present a control dam having means to prevent washout under the dam.

It is a further object of this invention to present a control dam which is light in weight and can be readily transported from place to place where the dam may be needed.

Other objects and many of the attendant advantages of this invention will be apparent from the following detailed description taken in conjunction with the accompanying drawings:

Figure 1 is a side elevation of an irrigation syphon including the improved control gate;

Figure 2 is a top plan view of an irrigation ditch with the improved syphon and gate in place;

Figure 3 is a vertical section through the improved control gate substantially on the plane indicated by the line 3—3 of Figure 2;

Figure 4 is an enlarged detail view with parts broken away, taken substantially on the plane indicated by the line 4—4 of Figure 3;

Figure 5 is an enlarged detail view with parts broken away and taken substantially on the plane indicated by the line 5—5 of Figure 3;

Figure 6 is a view similar to Figure 5 but showing the gate closed; and

Figure 7 is an enlarged detail view of the face of the gate pan and taken substantially on the plane indicated by the line 7—7 of Figure 3.

In the exemplary embodiment according to the invention, an irrigation ditch 10 has a control dam 12 constructed of earth or other loose material for controlling the flow of water from the ditch 10 to a lateral 14. A substantially U-shaped syphon extends from the ditch 10 to the lateral 14 for the intention of controlling the flow of water from the ditch 10 into the lateral 14. The inverted U-shaped syphon 16 is provided with a valve 18 for exhausting air from the syphon to start the flow of water from the ditch 10 to the lateral 14.

The control of water flow through the syphon 16 is controlled by means of a gate having a gate plate 20 with an opening 22 therein rigidly connected to the end of the syphon 16. A pair of angle members 24 and 26 are fastened on the back of the gate plate 20 and have inturned angles 28 and 30. The angles 24 and 26 may be of any desired construction but are preferably constructed by turning up the edge of the gate plate 20 so that the angles 24 and 26 are integral with the base plate 20. The angles 24 and 26 with the inturned flanges 28 and 30 provide a track in which is slidably mounted a gate pan 32. Preferably, the gate pan 32 is provided with turned up edges 34 to provide reinforcing or stiffening edges to the plate 32. Brackets 36 and 38 are rigidly secured on the rear face of the gate pan 32 and have journaled therein a cam rod 40. A pair of semicylindrical cams 42 are rigidly secured on the opposite ends of the cam rod portions. The cam 42 cooperates with the underneath side of the flanges 28 and 30 to securely lock the gate pan in any desired position along the track. Operating levers 44 are rigidly attached to the cam rods 40 and are so adjusted that the levers 44 bear against the rear of the gate pan 32 after the cams 42 have just passed over center so that the pressure tends to lock the cams and the gate in position.

An operating handle 46 is angularly attached to the control lever 44 of the cam rods 40, in this instance, the handle 46 is disposed at an angle of ninety degrees with respect to the cam lever 44 but obviously any desired angle could be used. An annular pad 50 of compressible sealing material is arranged on the sealing face of the gate pan 32 and is adapted to be sealed around the opening 22 to seal said opening water- and airtight so that the syphon can be properly operated.

Preferably, the gate plate 20 is provided with flanges 52 and 54 to properly stiffen the plate against flexing when in use. The flange 52 is preferably turned upstream so that it may be used for a handle when carrying the gate and putting it in position. The flange 54 is preferably turned downstream for the attachment of a washout plate 56. The washout plate 56 is preferably of somewhat curved construction so that it sets at an angle with respect to the gate plate 20 and has an upturned lift 58 to direct the water so that it flows on downstream without washing out the dam 12 or the bottom of the ditch under the control gate.

Eddy current guards 60 are preferably constructed of angular formations and connected between the gate plate 20 and the lateral edges of the washout shields 56.

In operating the discharge gate syphon, the gate pan 32 is adjusted over the opening 22 and sealed in airtight position, as best indicated in Figure 6. The syphon 16 is then placed in position over the dam 12 with the upstream end of the syphon 16 being supported on a suitable foot 52 to prevent it being bogged down in the mud in the bottom of the ditch. The air is then pumped out of the syphon tube 16 by means of the valve 18 and the valve 18 closed so that the syphon remains filled with water. The gate pan 32 may then be moved to any position to open the passage 22 as shown in Figure 5 or in Figure 3. Obviously, the gate pan 32 can be completely removed from the track if desired, to change gates or to repair or to replace the sealing pads or the gate pan 32 may be utilized to partially close the opening 22 to control the volume of water passing through the syphon 16 so that a single size syphon 16 may be used to pass a variable quantity of water.

The washout shield 56 deflects the flow of water through the opening 22 and causes it to flow downstream while the lift 58 gives it an upward turn and prevents it from digging out the bottom of the ditch 14, also the lateral shield or eddy current shield prevents the water from flowing against the sides of the ditch and washing out and destroying the side walls of the ditch because of the substantially continuous flow of water from the gate downstream in the ditch 14.

While for purposes of illustration, a specific embodiment of the invention has been shown and described according to the best present understanding thereof, it will be obvious that any changes or modifications can be made therein, without departing from the true spirit of the invention, or the scope of the appended claims.

Having described the invention, what is claimed as new is:

1. A water gate comprising a gate plate having an opening therethrough, a pair of angle members having one edge rigidly fixed on said gate plate and arranged in parallel relation on opposite sides of said opening, the flanges of said angle members being turned in, said angle members forming a gate track, a gate pan slidable in said track, aligned brackets secured on the back of said gate pan, a cam rod journaled in said brackets, cam members secured on the ends of said cam rod under said inturned flanges, a cam lever secured to said cam rod at a angle such that said lever makes contact with said gate pan when said cam has just passed over center, a handle secured to said lever and extending in angular relation thereto.

2. A water gate comprising a gate plate having an opening therethrough, angle members on said gate plate, the flanges of said angle members being turned in, said angle members forming a gate track, a gate pan slidable in said track, brackets secured on the back of said gate pan, a cam rod journaled in said brackets, cam faces secured on the ends of said cam rod under said inturned flanges, a cam lever secured to said cam rod at an angle such that said lever makes contact with said gate pan when said cam has just passed over center, a handle rigidly secured to said lever.

3. For use with a water gate having a gate plate with an aperture therein, a gate closure comprising a pair of angle members, said angle members being secured on the gate plate in parallel relation and arranged on opposite sides of said aperture, said angle members forming a gate track, a gate pan slidable in said track, brackets secured on the back of said gate pan, a cam rod journaled in said brackets, cam members secured on the ends of said cam rod, said cam members being positioned under the flanges of said angle members, a radial lever secured intermediate the ends of said cam rod, said lever being arranged at an angle of the order of a right angle with respect to the high point of said cams, an operating handle fixed on said lever and extending in angular relation thereto.

References Cited in the file of this patent

UNITED STATES PATENTS

| | | |
|---|---|---|
| 833,303 | Clark | Oct. 16, 1906 |
| 868,863 | Huntoon | Oct. 22, 1907 |
| 894,240 | Taylor | July 28, 1908 |
| 925,880 | Doolittle | June 22, 1909 |
| 962,624 | Cook | June 28, 1910 |
| 1,161,997 | Thompson | Nov. 30, 1915 |
| 1,192,141 | White | July 25, 1916 |
| 2,272,655 | Briese | Feb. 10, 1942 |
| 2,393,867 | Nicholson | Jan. 29, 1946 |